(12) United States Patent
Koo

(10) Patent No.: US 9,320,011 B2
(45) Date of Patent: Apr. 19, 2016

(54) MOBILE TERMINAL, METHOD OF COMPUTING ABSOLUTE COORDINATES OF WIRELESS AP BY MOBILE TERMINAL, AND SYSTEM OF COMPUTING ABSOLUTE COORDINATES OF WIRELESS AP USING MOBILE TERMINAL

(75) Inventor: Jahyoung Koo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/349,061

(22) PCT Filed: May 16, 2012

(86) PCT No.: PCT/KR2012/003819
§ 371 (c)(1),
(2), (4) Date: Apr. 1, 2014

(87) PCT Pub. No.: WO2013/065919
PCT Pub. Date: May 10, 2013

(65) Prior Publication Data
US 2014/0248905 A1    Sep. 4, 2014

Related U.S. Application Data

(60) Provisional application No. 61/554,811, filed on Nov. 2, 2011.

(30) Foreign Application Priority Data

Nov. 9, 2011   (KR) ........................ 10-2011-0116628

(51) Int. Cl.
*H04W 64/00* (2009.01)
*G01S 5/02* (2010.01)
*G01S 5/14* (2006.01)

(52) U.S. Cl.
CPC ........... *H04W 64/003* (2013.01); *G01S 5/0242* (2013.01); *G01S 5/14* (2013.01)

(58) Field of Classification Search
CPC ..................................................... H04W 64/11
USPC ................................................ 455/456.1–457
See application file for complete search history.

(56) References Cited

U.S. PATENT DOCUMENTS

2007/0082677 A1* 4/2007 Donald Hart et al. ..... 455/456.1
2009/0280824 A1* 11/2009 Rautiainen ................. 455/456.1
2011/0021234 A1* 1/2011 Tibbitts et al. ............... 455/517

FOREIGN PATENT DOCUMENTS

| KR | 1020040094059 | 11/2004 |
| KR | 1020080099940 | 11/2008 |
| KR | 1020090063549 | 6/2009 |
| KR | 1020100056178 | 5/2010 |

* cited by examiner

*Primary Examiner* — Kashif Siddiqui
*Assistant Examiner* — Ather Mohiuddin
(74) *Attorney, Agent, or Firm* — Lee, Hong, Degerman, Kang & Waimey

(57) ABSTRACT

A mobile terminal capable of receiving a radio signal from a wireless access point (AP) and a method of computing absolute coordinates of a wireless AP thereof are provided. The mobile terminal includes: a main body; a location information unit mounted in the main body and collecting absolute coordinates of the main body; a wireless communication unit computing relative distance information between an external wireless access point (AP) and the main body by using radio signals transmitted and received between the wireless AP and the main body; a detection unit detecting relative coordinates of the main body by using the distance information and relative coordinates of the wireless AP; and a controller computing absolute coordinates of the wireless AP.

16 Claims, 14 Drawing Sheets

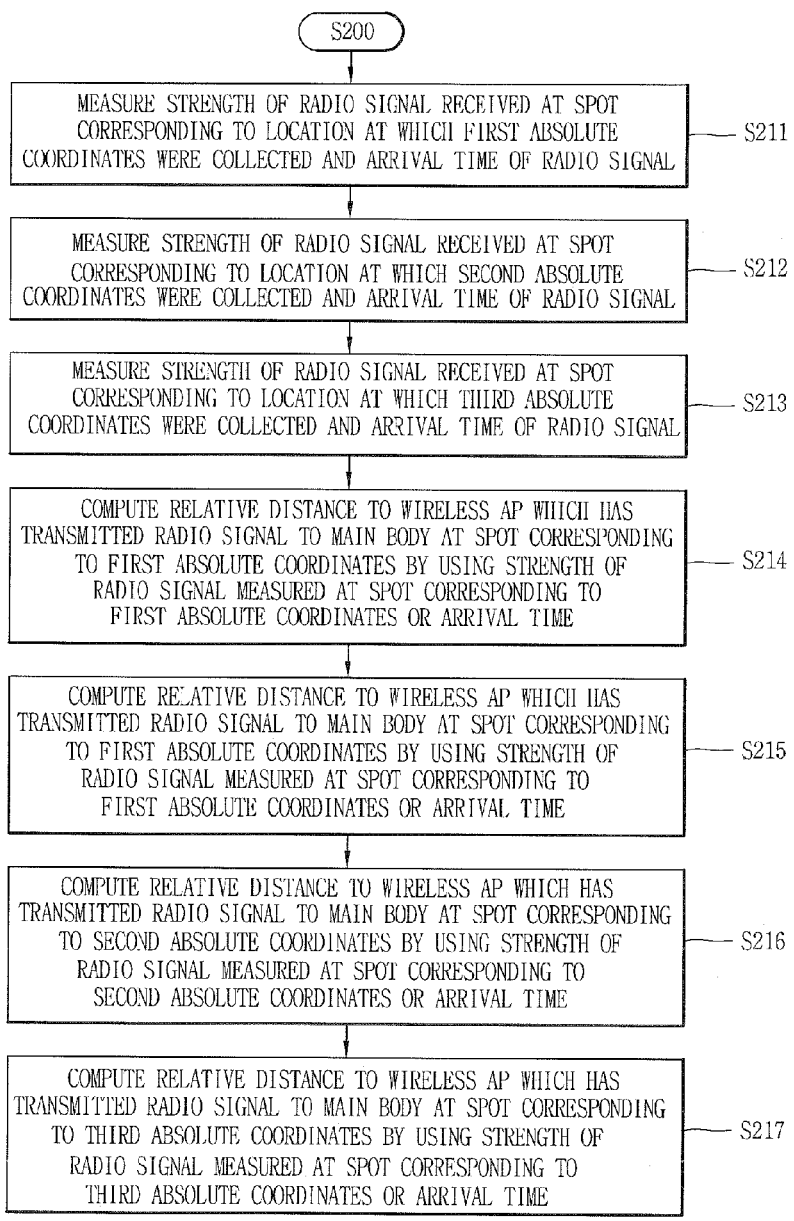

Fig. 21
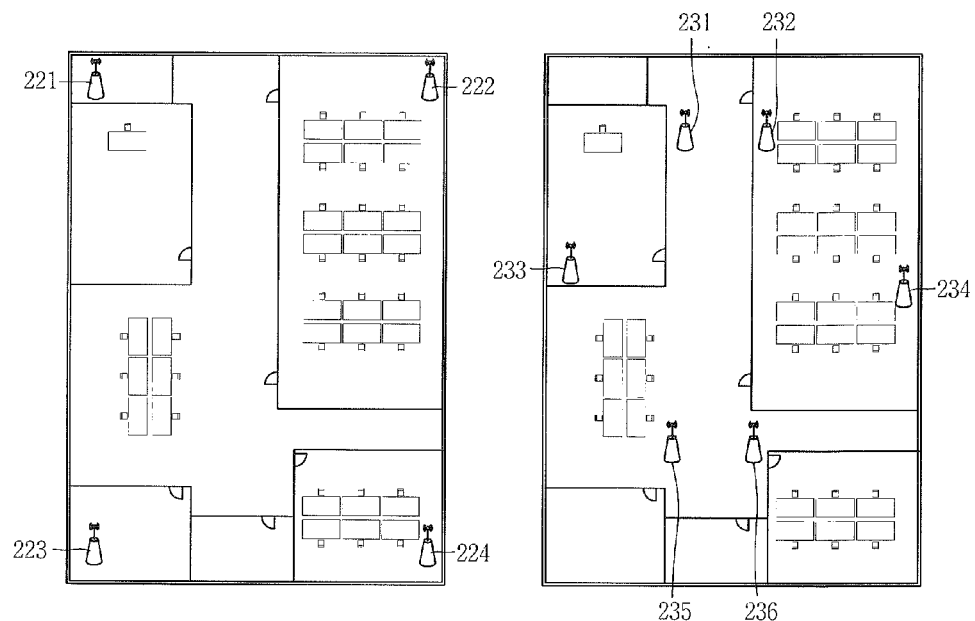
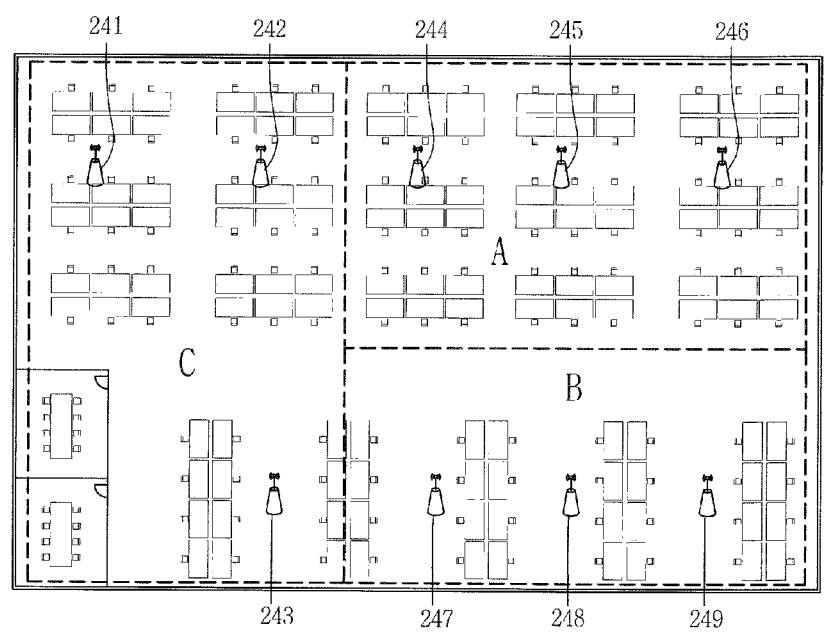

MOBILE TERMINAL, METHOD OF COMPUTING ABSOLUTE COORDINATES OF WIRELESS AP BY MOBILE TERMINAL, AND SYSTEM OF COMPUTING ABSOLUTE COORDINATES OF WIRELESS AP USING MOBILE TERMINAL

CROSS-REFERENCE TO RELATED APPLICATIONS

This application is the National Stage filing under 35 U.S.C. 371 of International Application No. PCT/KR2012/003819, filed on May 16, 2012, which claims the benefit of earlier filing date and right of priority to Korean Patent Application No. 10-2011-0116628, filed on Nov. 9, 2011, and also claims the benefit of U.S. Provisional Application No. 61/554,811, filed on Nov. 2, 2011, the contents of which are all incorporated by reference herein in their entirety.

TECHNICAL FIELD

The present disclosure relates to a mobile terminal capable of receiving a radio signal from a wireless access point (AP) and a method of computing absolute coordinates of a wireless AP thereof.

BACKGROUND ART

Mobile terminals may be configured to perform various functions. Various functions may include, for example, a data and voice communication function, a function of capturing an image or video through a camera, a voice storage function, a function of reproducing (or playing) a music file through a speaker system, a function of displaying an image or a video, and the like. Some of mobile terminals include an additional function of executing games, while others may be implemented as multimedia players. In addition, recently, mobile terminals receive broadcast or multicast signals to allow users to view a video or television programs.

Efforts for supporting and increasing the functions of mobile terminals are ongoing. Such efforts may include improvement of software or hardware, as well as alteration and improvement of structural components forming mobile terminals.

Mobile terminals may be able to perform data communication through wireless communication with a wireless access point (AP). Meanwhile, in a mobile terminal or a particular system, when actual coordinates (or absolute coordinates) of a wireless AP are known, WiFi positioning system can be implemented. However, it is difficult to obtain actual coordinates of a wireless AP in actuality.

DISCLOSURE OF INVENTION

Technical Problem

An aspect of the detailed description is to provide a mobile terminal capable of computing absolute coordinates of a wireless AP and a method of computing absolute coordinates of a wireless AP by a mobile terminal.

Another aspect of the detailed description is to provide a wireless AP absolute coordinate computing system capable of computing absolute coordinates of a wireless AP by using different mobile terminals, and a control method thereof.

Solution to Problem

To achieve these and other advantages and in accordance with the purpose of this specification, as embodied and broadly described herein, a mobile terminal includes: a main body; a location information unit mounted in the main body and collecting absolute coordinates of the main body; a wireless communication unit computing relative distance information between an external wireless access point (AP) and the main body by using radio signals transmitted and received between the wireless AP and the main body; a detection unit detecting relative coordinates of the main body by using the distance information and relative coordinates of the wireless AP; and a controller computing absolute coordinates of the wireless AP.

The wireless communication unit may transmit and receive radio signals to and from at least one wireless AP at a spot corresponding to a location at which the absolute coordinates were collected.

The wireless communication unit may compute distance information corresponding to the radio signals, and match the computed distance information to the absolute coordinates and the wireless AP which transmitted the radio signal to the main body, at a spot corresponding to the location at which the absolute coordinates were collected.

When radio signals are received from a plurality of wireless APs at the spot corresponding to the location at which the absolute coordinates were collected, the wireless communication unit may compute a plurality of types of distance information each corresponding to the plurality of radio signals, and match the plurality of types of computed distance information to the absolute coordinates corresponding to the spot and the plurality of wireless APs.

The absolute coordinates of the main body may be collected from at least three different locations.

A wireless AP, which has transmitted a radio signal to the main body, may be previously disposed at a spot corresponding to the location at which the absolute coordinates were collected, on a pre-set relative coordinate region, and the detection unit may detect relative coordinates of the main body located at a spot distant by the matched distance information from the relative coordinates of the wireless AP which has transmitted a radio signal to the main body at the spot corresponding to the location at which the absolute coordinates were collected, by using the distance information matched to the absolute coordinates.

The detection unit may match the detected relative coordinates to the absolute coordinates.

The controller may compute a conversion parameter for converting the detected relative coordinates into absolute coordinates matched by the detection unit.

The conversion parameter may be a matrix having a size corresponding to the number of relative coordinates of the wireless AP disposed in the relative coordinate region.

The conversion parameter may include at least one of a size matrix, an angle matrix, and a location movement matrix, and the size of the size matrix, the angle matrix, and the location movement matrix may correspond to the number of relative coordinates of the wireless AP.

The absolute coordinates of the wireless AP disposed in the relative coordinate region may be computed through a pre-set computation process using the relative coordinates of the wireless AP disposed in the relative coordinate region and the conversion parameter.

The pre-set computation process may be sequentially multiplying the size matrix, the relative coordinates of the wireless AP, and the angle matrix, and adding the location movement matrix to a result value of the multiplication.

The location information unit may collect the absolute coordinates of the main body from a plurality of different locations.

The radio signals received from the spots each corresponding to the plurality of collected absolute coordinates may be received from the same wireless AP or at least one of the radio signals may be received from a different wireless AP.

The distance information may be computed by using at least one of the strength of the radio signals received from the wireless AP and a time of arrival (TOA) of the radio signals received from the wireless AP.

To achieve these and other advantages and in accordance with the purpose of this specification, as embodied and broadly described herein, a method of computing absolute coordinates of a wireless AP of a mobile terminal, includes: collecting absolute coordinates of a main body from at least three different locations; computing relative distance information between an external wireless access point (AP) and a main body by using a radio signal transmitted from the wireless AP to the main body; detecting relative coordinates of the main body corresponding to the collected absolute coordinates by using the distance information and pre-set relative coordinates of the wireless AP; and computing absolute coordinates of the wireless AP by using the relative coordinates of the main body and the absolute coordinates of the main body corresponding to the relative coordinates of the main body.

In the computing of the distance information, the computed distance information may be matched to the absolute coordinates and the wireless AP which has transmitted the radio signal to the main body form the spot corresponding to the location at which the absolute coordinates were collected.

The computing of the absolute coordinates may include: computing a conversion parameter for converting the relative coordinates of the main body into absolute coordinates corresponding to the relative coordinates of the main body; and applying the computed conversion parameter to relative coordinates of a pre-set wireless AP by using a pre-set computation method, wherein the conversion parameter is a matrix having a size corresponding to the number of the absolute coordinates of the main body.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Advantageous Effects of Invention

The mobile terminal and the method of computing absolute coordinates of a wireless AP according to an embodiment of the present invention, absolute coordinates of a wireless AP can be easily obtained by applying a conversion parameter for converting absolute coordinates of a mobile terminal into relative coordinates to relative coordinates of the wireless AP. Also, through the mobile terminal and the method of computing absolute coordinates of a wireless AP according to an embodiment of the present invention, a wireless network positioning system can be established by computing absolute coordinates of wireless APs.

BRIEF DESCRIPTION OF DRAWINGS

FIG. 8 is a flow chart illustrating a method of computing distance information in the mobile terminal according to an embodiment disclosed in the present disclosure.

FIG. 9 is a conceptual view explaining a method of computing distance information in the mobile terminal according to an embodiment disclosed in the present disclosure.

FIG. 21 is a conceptual view explaining a method of computing absolute coordinates of wireless APs existing in different floors by using the mobile terminal according to an embodiment disclosed in the present disclosure.

MODE FOR INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP), a navigation system, and a fixed terminal such as a digital TV, a desktop computer, etc. It is assumed that the terminal of the present invention is a mobile terminal. However, it will be obvious to those skilled in the art that the present invention may be also applicable to the fixed terminal, except for specific configurations for mobility.

Figure 1:
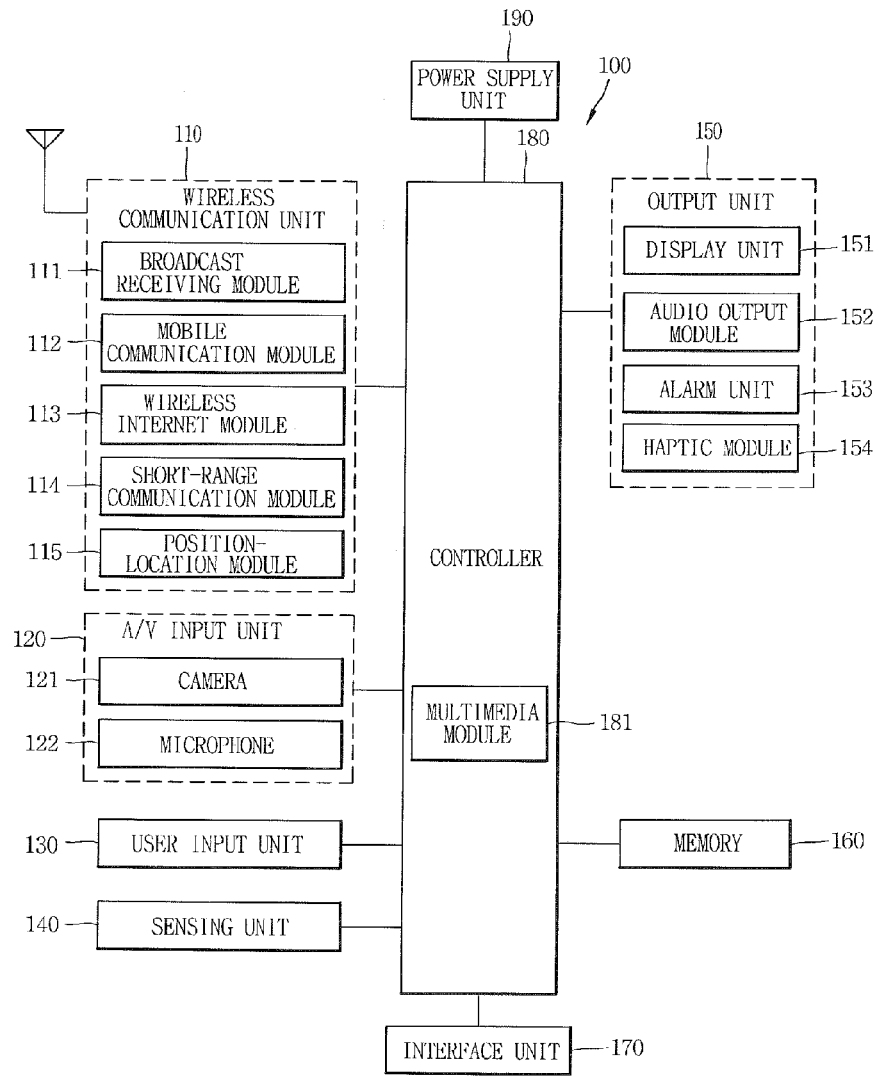
FIG. 1 is a block diagram of a mobile terminal according to an embodiment of the present invention.

FIG. 1 is a block diagram of a mobile terminal 100 according to an embodiment of the present invention.

As shown in FIG. 1, the mobile terminal 100 includes a wireless communication unit 110, an AN (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transceive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100, For example, when the mobile terminal 100 is in a phone call mode, the display unit 151 may display a User Interface (UI) or a Graphic User Interface (GUI) associated with a call.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the mobile terminal 100 through a vibration means as a feedback with respect to the key signal input. Through the vibration, the user may recognize the occurrence of an event. A signal for notifying about the occurrence of an event may be output to the display unit 151 or to the voice output module 152.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display unit (hereinafter, will be referred to as 'touch screen' 151) in the locked state.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2:
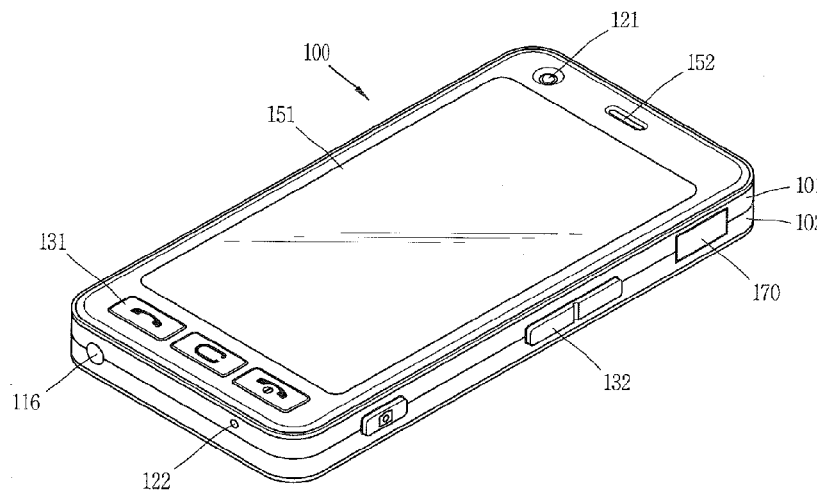
FIGS. 2 and 3 are perspective view of the mobile terminal according to an embodiment of the present invention.
Figure 3:
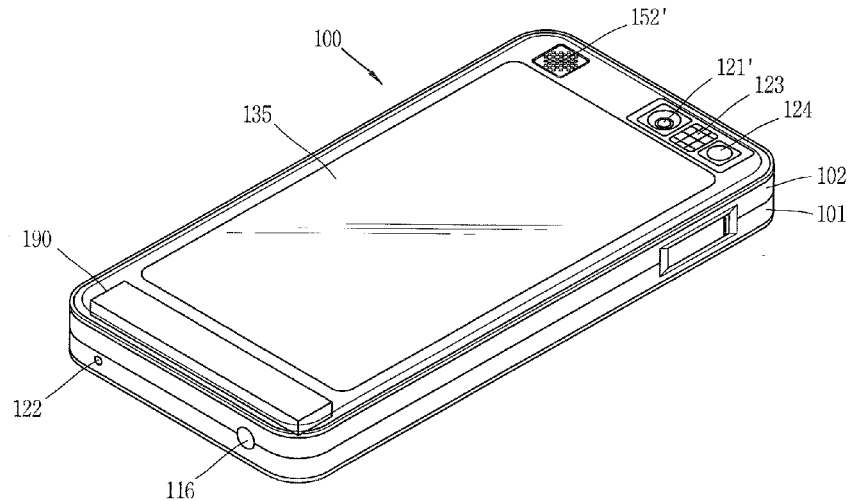

FIG. 2 is a front perspective view of the mobile terminal according to an embodiment of the present invention, and FIG. 3 is a rear perspective view of the mobile terminal of FIG. 2 according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, user input units 130/131 and 132, a microphone 122, an interface unit 170, etc.

The display unit 151 occupies most parts of a main surface of the front case 101. The audio output unit 152 and the camera 121 are arranged at a region adjacent to one end of the stereoscopic display unit 151, and the user input unit 131 and the microphone 122 are arranged at a region adjacent to another end of the display unit 151. The user input unit 131, the interface unit 170, etc. may be arranged on side surfaces of the front case 101 and the rear case 102. On the other hand, the microphone 122 is arranged on another end of the body.

The user input unit 130 is manipulated to receive a command for controlling the operation of the mobile terminal 100, and may include a plurality of manipulation units 131 and 132. The manipulation units 131 and 132 may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 3, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151, the touch pad 135 may be formed to be light-transmissive. In this case, if the display unit 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display unit 151 of the front case 101. The touch pad 135 may be disposed on the rear surface of the display unit 151 in parallel. The touch pad 135 may have a size equal to or smaller than that of the display unit 151.

Figure 4:
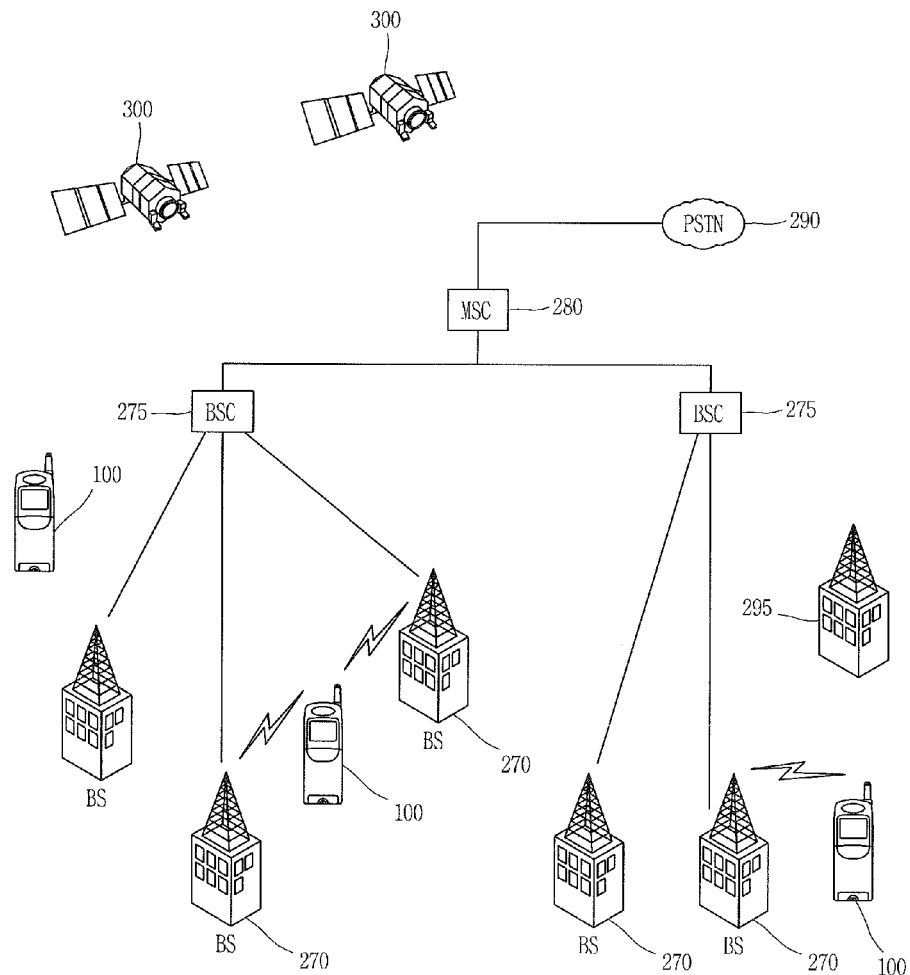
FIG. 4 is a conceptual view of a communication system in which the mobile terminal related to the present invention is operable.

FIG. 4 is a conceptual view of a communication system in which the mobile terminal 100 according to the present invention is operable.

The communication system may utilize different wireless interfaces and/or physical layers. Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

As shown in FIG. 4, a CDMA wireless communication system may include a plurality of mobile terminals 100, a plurality of base stations 270, a plurality of base station controllers (BSCs) 275, and a mobile switching center (MSC) 280. The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omni-directional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270. The base stations 270 may also be denoted as "cell sites." Alternatively, individual sectors of a given base station 270 may be referred to as cell sites.

As shown in FIG. 4, a broadcasting transmitter (BT) 295 transmits a broadcasting signal to mobile terminals 100 operating within the system. In addition, the broadcast receiving module 111 (FIG. 1) of the mobile terminal 100 is typically configured to receive broadcast signals transmitted by the DMB transmitter 295.

FIG. 4 further illustrates several global positioning system (GPS) satellites 300. Such satellites 300 facilitate locating the position of some or all of the mobile terminals 100. In FIG. 2, two satellites are shown, but positioning information may be obtained with greater or fewer satellites. In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications. In addition, each reverse-link signal received by a given base station 270 is processed within that base station 270, and the resulting data is forwarded to an associated BSC 275. The BSC 275 provides call resource allocation and mobility management functionality including soft handoffs between the base stations 270. Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

Also, the mobile terminal that may be able to include at least one or more of the components as described above may be able to compute absolute coordinates of a wireless AP that transmits a radio signal to the mobile terminal by using location information collected from a plurality of different spots.

Hereafter, a method of computing absolute coordinates of a wireless AP by using the mobile terminal according to an embodiment of the present invention will be described with reference to the accompanying drawings.

Figure 5:
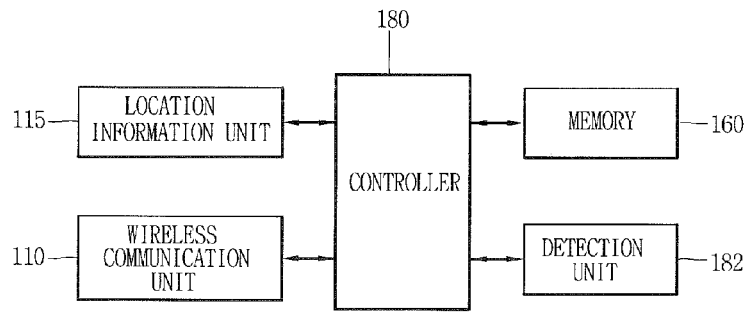
FIG. 5 is a block diagram of a mobile terminal according to an embodiment disclosed in the present disclosure.

FIG. 5 is a block diagram of a mobile terminal according to an embodiment disclosed in the present disclosure. Here, content already described above with reference to FIG. 1 will be omitted. With reference to FIG. 5, the mobile terminal 100 may include the controller 180, the wireless communication unit 110, the location information unit 115, the memory 160, and a detection unit 182.

The location information unit 115 is mounted in the mobile terminal (hereinafter, referred to as 'main body') and collects absolute coordinates of the main body by using a global positioning system (GPS).

Here, the absolute coordinates are coordinates expressed on the basis of a starting point of a coordinates system in which a location of an addressable point is designated. The absolute coordinates are actual coordinates at which the main body is located.

Here, the location information unit 115 may collect absolute coordinates corresponding to a place where the main body is located at an interval previously set by the controller 180, and when the main body is located at a spot satisfying specific conditions, the location information unit 151 may collect absolute coordinates of the main body. Also, the location information such as the absolute coordinates maybe collected when an application requiring location information is executed in the mobile terminal, and the controller 180 stores the collected location information in the memory 160 and uses it to compute absolute coordinates of a wireless AP.

Also, the location information unit 115 may collect absolute coordinates of the main body on the basis of a location movement of the main body. Also, the location information unit 115 may store the plurality of collected absolute coordinates in the memory 160, or the like.

Meanwhile, the wireless communication unit 110 may compute relative distance information between the wireless AP and the main body by using radio signals transmitted or received between the external wireless AP and the main body.

Here, the external wireless AP plays a role of relaying a network and wireless devices so that wireless devices such as a mobile terminal to access an arbitrary network. The external wireless AP plays a role of an intermediator to connect the wireless devices to the network by using standard related to WiFi or Bluetooth.

The external wireless APs are located at sites separated from the mobile terminal (or the main body), and as described above, the external wireless APs may access an arbitrary network the mobile terminal wants to access by using a radio signal. At this time, first, the mobile terminal may be required to access a wireless AP, a radio signals are transmitted or received between the mobile terminal and the wireless AP for a connection.

Namely, the wireless communication unit 110 included in the mobile terminal may transmit and receive radio signals to and from the wireless APs around the place where the mobile terminal is currently located. The wireless communication unit 110 may automatically transmit or receive a radio signal when there is a wireless AP therearound although it is not connected to a specific network.

Also, as described above, in order to transmit a radio signal from a wireless AP to the mobile terminal, the mobile terminal is located within a predetermined distance from the wireless AP. Here, the predetermined distance may vary according to the characteristics of the wireless APs.

Also, as the distance between the wireless AP and the mobile terminal is shorter, a signal strength of a radio signal transmitted from the wireless AP is more stronger and the speed of the radio signal transmitted from the wireless AP to the mobile terminal may faster.

Namely, as the strength of the radio signal received from the mobile terminal is stronger, it can be supposed that the wireless AP which has transmitted the radio signal to the mobile terminal is closer to the mobile terminal Also, the wireless communication unit 110 may extract a name of the wireless AP which has transmitted the radio signal to the mobile terminal or may assign an arbitrary identifier. Thus, although a plurality of radio signals are transmitted from a plurality of wireless APs, the plurality of wireless APs can be identified.

As described above, the wireless communication unit 110, which is able to receive a radio signal from at least one wireless AP, can store information (or identification information) of a wireless AP which has transmitted a radio signal to the main body at a spot corresponding to the location at which the absolute coordinates of the main body were collected by the location information unit 115. In addition, the wireless communication unit 110 may measure a strength of a radio signal transmitted to the main body at a spot corresponding to the location at which the absolute coordinates of the main body were collected, and measure a time at which the radio signal arrives at the main body.

Thus, relative distance information between the main body and the wireless AP can be computed by using the radio signal information (radio signal strength information or radio signal arrival time information). Meanwhile, the spot corresponding to the relative distance information between the main body and the wireless AP is a spot corresponding to the location at which the absolute coordinates of the main body are collected by the location information 115. The absolute coordinates and the spot corresponding to the distance information may be identical or may have a slight difference.

Meanwhile, the wireless communication unit 110 or the controller 180 may match the identification information of the wireless AP and the radio signal information, and also match the absolute coordinates of the main body corresponding to the spot at which the radio signal was transmitted, together. The matched absolute coordinates, the wireless signal information, and the identification information of the wireless AP may be stored in the memory 160.

Meanwhile, a plurality of radio signals may be transmitted to the man body at the spot corresponding to the location at which the absolute coordinates of the main body were collected. Namely, the main body receives radio signals from a plurality of wireless APs at a spot corresponding to the location at which the absolute coordinates of the main body were collected.

As described above, when the absolute coordinates of the main body, the radio signal information, the information about the wireless AP, and the relative distance information between the wireless AP and the main body are obtained, the detection unit 182 may detect relative coordinates of the main body by using the relative distance information between the wireless AP and the main body.

Here, the relative coordinates of the main body are coordinates indicating a relative distance relationship between the wireless APs which have transmitted radio signals to the main body, and the relative coordinates of the wireless AP are previously designated on a relative coordinates region. Here, as for a method of obtaining the relative coordinates of the wireless AP, various algorithms including "Autonomous Construction of a WiFi Access Point map Using Multidimensional Scaling", and the like, exist, and in the present disclosure, a description of a specific method of obtaining relative coordinates of the wireless AP will be omitted.

The detection unit 182 detects relative coordinates of the main body with respect to the wireless AP which has transmitted the radio signal by using the information about the radio signal collected at a spot corresponding to the location at which the absolute coordinates of the main body were collected.

Namely, the relative coordinates of the main body are located at a place which corresponds to the absolute coordinates of the main body corresponding thereto, and which is separated from the relative coordinates of the wireless AP that has transmitted the radio signal to the main body from the spot corresponding to the absolute coordinates by the strength of the radio signal or the arrival time.

Also, when a plurality of wireless APs transmit radio signals to the main body from the spot corresponding to the absolute coordinates of the main body, the detection unit 182 detects relative coordinates satisfying a relative distance relationship with the plurality of wireless APs.

In order to compute absolute coordinates of the wireless APs by using the relative coordinates of the main body, the detection unit 182 detects at least three relative coordinates of the main body. This means that the location information unit 115 should collect at least three absolute coordinates of the main body.

Also, the detection unit 182 may use all of the absolute coordinates collected by the location information unit 115, or may use only necessary information for the purpose of efficiency of computation.

As described above, when at least three relative coordinates of the main body are detected by the detection unit 182, the controller 180 computes a conversion parameter for converting the at least three relative coordinates into absolute coordinates corresponding to the at least three relative coordinates, respectively.

The controller 180 computes absolute coordinates of the wireless AP by applying the computed conversion parameter to the relative coordinates of the wireless AP which has transmitted the radio signal to the main body from the location corresponding to the respective absolute coordinates corresponding to the at least three relative coordinates of the main body.

Here, the number of the computed absolute coordinates of the wireless AP corresponding to the number of wireless APs which have transmitted radio signals to the main body from the spot corresponding to the at least three relative coordinates. When one wireless AP has transmitted the radio signal to the main body, the number of computed absolute coordinates of the wireless AP may be 1.

For example, it is assumed that a radio signal from an 'a1 wireless AP' is received at a spot corresponding to first absolute coordinates of the main body, radio signals from 'a1 wireless AP and a2 wireless AP' are received at a spot corresponding to second absolute coordinates, and a radio signal is received from an 'a3 wireless AP' at a spot corresponding to third absolute coordinates. Also, in a relative coordinates region, a 1 wireless AP, a2 wireless AP, a3 wireless AP are matched on the relative coordinates region of the corresponding wireless APs.

In such a case, the controller 180 may compute absolute coordinates of a1 wireless AP, a2 wireless AP, and a3 wireless AP which have transmitted radio signals to the main body from the spots corresponding to the first to third absolute coordinates, by using the first to third relative coordinates corresponding to the first to third absolute coordinates and the first to third absolute coordinates.

As described above, in the mobile terminal according to an embodiment of the present invention, the absolute coordinates of the wireless APs can be computed by using the absolute coordinates and the relative coordinates of the main body.

Hereinafter, the method of computing absolute coordinates of a wireless AP by using the components as described above will be described in more detail.

Figure 6:
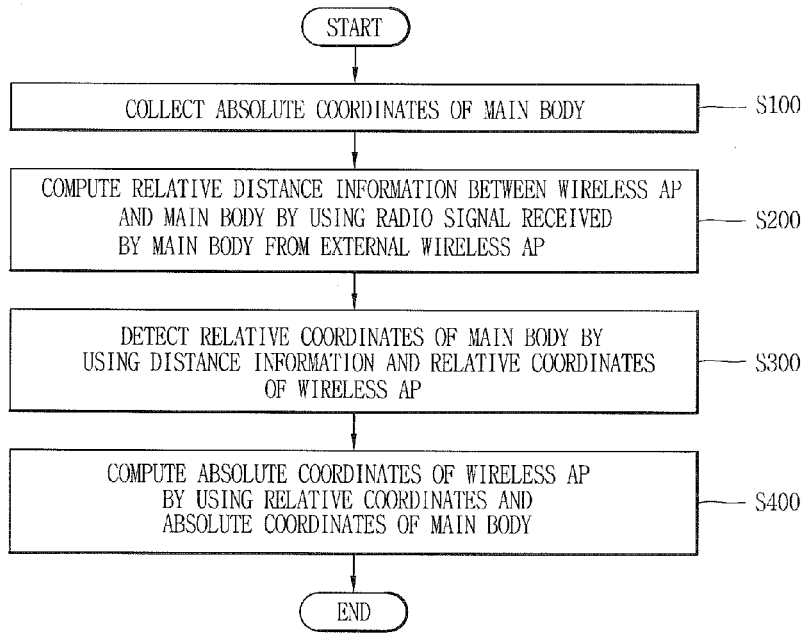
FIG. 6 is a flow chart illustrating a control method of a mobile terminal according to an embodiment disclosed in the present disclosure.
Figure 7:
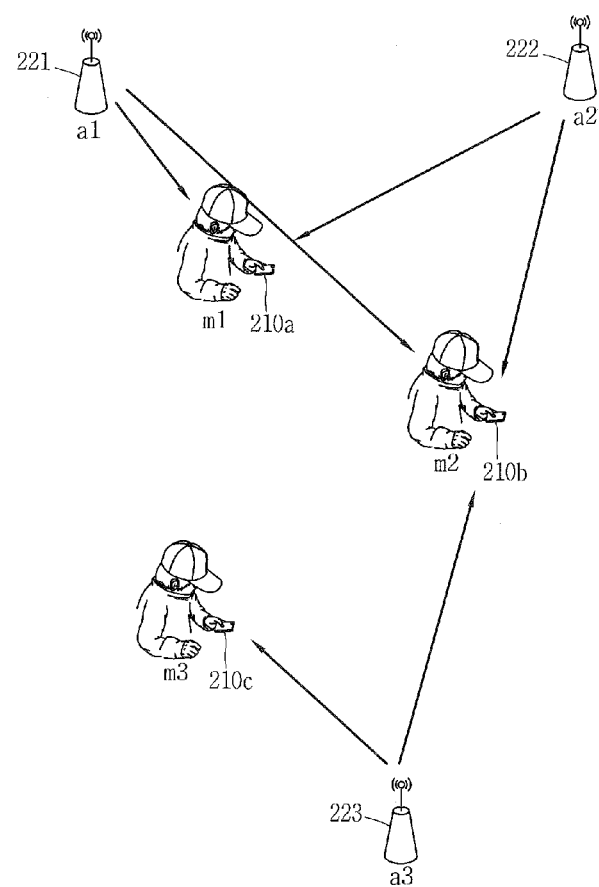
FIG. 7 is a conceptual view explaining a control method of the mobile terminal according to an embodiment disclosed in the present disclosure.

FIG. 6 is a flow chart illustrating a control method of a mobile terminal according to an embodiment disclosed in the present disclosure, and FIG. 7 is a conceptual view explaining a control method of the mobile terminal according to an embodiment disclosed in the present disclosure.

First, the location information unit (115, See FIG. 5) collects absolute coordinates of the main body (S100). Here, the absolute coordinates of the main body may be collected from at least three locations. As shown in FIG. 7, as the main body moves, namely, as the user moves from m1 to m2 and to m3, the location information unit 115 collects absolute coordinates of the main bodies 210a, 210b, and 210c) located at m1, m2, and m3, respectively.

Next, by using radio signals transmitted to the main body, the wireless communication unit 110 computes relative distance information between wireless APs which transmitted the radio signals and the main bodies located at the spots at which the radio signals were received (S200, See FIG. 6).

For example, as shown in FIG. 7, when the user is located at m1, the main body 210a receives radio signals from a1 wireless AP 221 and a2 wireless AP 222.

In this case, by using the strength and arrival time of the radio signals transmitted from the a1 wireless AP 221 and the a2 wireless AP 222 to the main body 210a, the wireless communication unit (110, See FIG. 5) computes relative distance information between the a1 wireless AP 221 and the a2 wireless AP 223 and the main body 210a.

Also, at the location m2, by using the strength or arrival time of radio signals transmitted from the a1 wireless AP 221, a2 wireless AP 222, and a3 wireless AP 223 to the main body 210b, relative distance information between the a1 wireless AP 221, a2 wireless AP 222, and a3 wireless AP 223 and the main body 210b, respectively.

Similarly, at the location m3, by using the strength or arrival time of a radio signal transmitted from the a3 wireless AP 223 to the main body 210c, relative distance information between the a3 wireless AP 223 and the main body 210c is computed.

A method of computing relative distance information between the main body and a wireless AP through the wireless communication unit 110 in step S200 described in FIG. 6 will be described in more detail with reference to FIGS. 7, 8, and 9.

FIG. 8 is a flow chart illustrating a method of computing distance information in the mobile terminal according to an embodiment disclosed in the present disclosure, and FIG. 9 is a conceptual view explaining a method of computing distance information in the mobile terminal according to an embodiment disclosed in the present disclosure.

Hereafter, for example, a method of using three previously collected absolute coordinates will be described.

First, in step S100 (See FIG. 6), when first, second, and third absolute coordinates of the main bodies 210a, 210b, and 210c (See FIG. 7) are collected at at least three locations m1, m2, m3 (See FIG. 7) in step S100 (See FIG. 6), the wireless communication unit 110 (See FIG. 5) measures strength of each of radio signals received at the spots corresponding to respective m1, m2, and m3 at which the first, second, third absolute coordinates were collected, or a time at which each radio signal arrives.

Here, the radio signal received at the location m1 may be a plurality of radio signals from a plurality of wireless APs, or may be one radio signal from one wireless AP.

Also, the wireless communication unit 110 may measure the strength of the radio signals or the arrival time thereof immediately when the radio signals are received by the main body, or may measure the strength of the radio signals or the arrival time on the basis of a control command by the user or the controller 180. As described above, the wireless communication unit may match the information of the wireless APs and the radio signals and store the same.

In detail, the wireless communication unit 110 measures a strength of the radio signal received at the spot corresponding to the location (the location m1, See FIG. 7) at which the first absolute coordinates were collected, or a time at which the radio signal arrives (S211, See FIG. 8).

Namely, at the spot corresponding to the location (the location m1, See FIG. 7) at which the first absolute coordinates were collected, the wireless communication unit 110 may measure strength of each of the radio signals received by the main body 210a from the a1 wireless AP 221 and a2 wireless AP 222, or a time at which each of the radio signals arrives.

In the same manner as described above, at the spot corresponding to the location (the location m2, See FIG. 7) at which the second absolute coordinates were collected, the wireless communication unit 110 measures a strength of each of radio signals received by the main body 210b from the a1 wireless AP 221, a2 wireless AP 222, and a3 wireless AP 223 or a time at which each of the radio signals arrives (S212). Also, at the spot corresponding to the location (the location m3, See FIG. 7) at which the third absolute coordinates were collected, the wireless communication unit 110 measures a strength of the radio signal receive by the main body 210c from the a3 wireless AP 223 or a time at which the radio signal arrives (S213).

Next, by using the strength and arrival time of each of the radio signals measured in steps S211, S212, and S213, the wireless communication unit 110 computes a relative distance to each of the wireless APs that transmitted the radio signals to the main body at the spots corresponding to the respective absolute coordinates.

First, at the spot corresponding to the first absolute coordinates (the location m1, See FIG. 7), a relative distance between the a1 wireless AP 221 and the a2 wireless AP 222, which have transmitted the radio signals to the main body 210, and the main body 210 (S214).

For example, as shown in FIG. 9, when the strength of the radio signal received from the a1 wireless AP 221 (in this embodiment, it is assumed that the strength of radio signals are measured) at the location m1 is the greatest, the wireless communication unit 110 records it as '20', and the strength of the radio signal received from the a2 wireless AP 222 is weaker by about half than the strength of the radio signal received from the a1 wireless AP 221, the wireless communication unit 110 records it as '10'. When no radio signal is received from the a3 wireless AP, the wireless communication unit 110 records it as '0'.

Namely, in the Table shown in FIG. 9, the wireless APs received from the absolute coordinates of the main body used to compute absolute coordinates of the wireless APs are displayed and information of the radio signals received from the wireless APs is displayed.

In consideration of the recorded radio signal information, a relative distance between the wireless APs and the main body can be computed.

In the same manner, at the spot corresponding to the second absolute coordinates (the location m2, See FIG. 7), the wireless communication unit 110 computes a relative distance between the a1 wireless AP 221, the a2 wireless AP 222, and the a3 wireless AP 223, which have transmitted radio signals to the main body 210b, and the main body 210b (S215). Also, at the spot corresponding to the third absolute coordinates (the location m3, See FIG. 7), the wireless communication unit 110 computes a relative distance between the a3 wireless AP 223, which has transmitted the radio signal to the main body 210c, and the main body 210c (S216).

In the same manner, the strength of each of the radio signals corresponding to the locations m2 and m3 is recorded in the Table illustrated in FIG. 9, and a relative distance between the main body and the respective wireless APs is computed by using the strength of the radio signals in FIG. 9.

For example, at the location m1, the main body 210 is close to the a1 wireless AP 221, farther from the a2 wireless AP 222 than from the a1 wireless AP 221, and farthest from the a3 wireless AP 223.

Meanwhile, in an embodiment of the present invention, the method of computing relative distances by using the Table as shown in FIG. 9 has been described. However, this is to help understand the present invention and the relative distance information may not necessarily be computed by using the Table in FIG. 9. The Table aims to show that relative distance relationships with respect to a plurality of wireless APs can be derived at the same spot according to the difference in strength of the signals received at the same spot or the difference in points in time at which signals arrive. Also, the method of computing relative distance information is called multi-dimensional scaling (MDS), and it is a type of a method of positioning n number of points which have distance therebetween that may be in accord with dissimilarity in a dimensional space when inter-object dissimilarity or similarity is given for n number of objects. Thus, a relative distance between a wireless AP and the main body may be computed through the MDS.

Meanwhile, as described above in steps S211 to S216, when the relative distances between the wireless APs and the main body are computed by using the strength of each of the radio signals or the arrival time of each of radio signals, relative coordinates of the main body are detected by using the distance information and the relative coordinates of the wireless APs (S300, See FIG. 6).

A method of detecting relative coordinates of the main body will be described in more detail with reference to FIGS. 10, 11, 12, 13, and 14.

Figure 10:
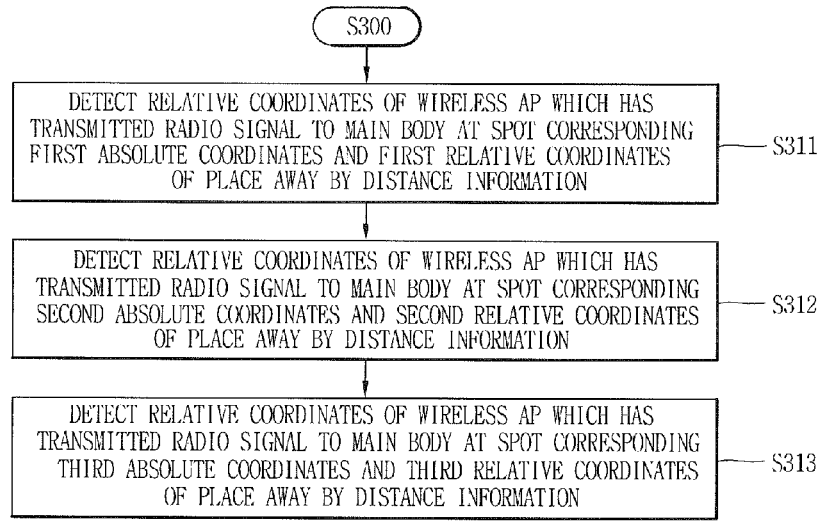
FIG. 10 is a flow chart illustrating a method of detecting relative coordinates in the mobile terminal according to an embodiment disclosed in the present disclosure.

FIG. 10 is a flow chart illustrating a method of detecting relative coordinates in the mobile terminal according to an embodiment disclosed in the present disclosure. FIGS. 11 to 14 are conceptual views explaining a method of detecting relative coordinates in the mobile terminal according to an embodiment disclosed in the present disclosure.

Here, as described above, the wireless APs transmit radio signals to the main body from spots corresponding to the first to third absolute coordinates. A single wireless AP or a plurality of wireless APs may be provided. Also, it is assumed that relative coordinates of wireless APs are previously computed by a pre-set method in the following description.

First, at a spot corresponding to the first absolute coordinates (the location of m1, See FIG. 7), the detection unit 182 detects first relative coordinates of a place away by the distance information computed in step S200 in consideration of relative coordinates or the wireless APs 221 and 222 that have transmitted radio signals to the main body 210a (S311).

Figure 11:
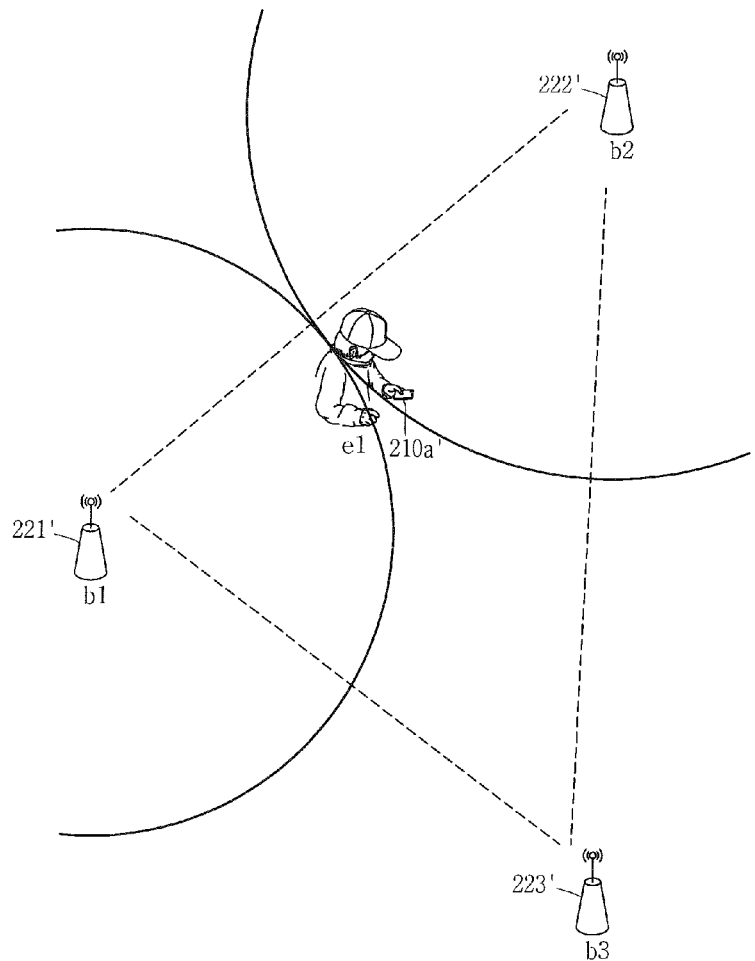
FIGS. 11 to 14 are conceptual views explaining a method of detecting relative coordinates in the mobile terminal according to an embodiment disclosed in the present disclosure.

For example, a method of computing relative coordinates of the main body will be described with reference to FIG. 11.

In the relative coordinates region, b1, b2, and b3 wireless APs 221', 222', 223' corresponding to the a1, a2, a3 wireless APs 221, 222, 223 which have transmitted radio signals from the spots corresponding to the first to third absolute coordinates to the main body are matched.

Then, the detection unit 182 reflects the distance information in the relative coordinates region by using the already computed distance information as described above in FIG. 9.

Thus, at the first relative coordinate spot e1 corresponding to the location m1 210a at which the first coordinates were collected, the relative coordinates of the main body 210a' is closer to the b1 wireless AP 221' and far from the wireless AP 222'.

In this manner, at the spot corresponding to the second absolute coordinates (the location of m2, See FIG. 7), the detection unit 182 detects second coordinates of a place away by the distance information computed in step S200 in consideration of the relative coordinates of the wireless APs 221, 222, 223 (See FIG. 7) which have transmitted radio signals to the main body 210b (S312).

In a similar manner, at the spot corresponding to the third absolute coordinates (the location of m3, See FIG. 7), the detection unit 182 detects second coordinates of a place away by the distance information computed in step S200 in consideration of the relative coordinates of the wireless AP 223 (See FIG. 7) which have transmitted radio signals to the main body 210c (See FIG. 7) (S313).

Figure 12:
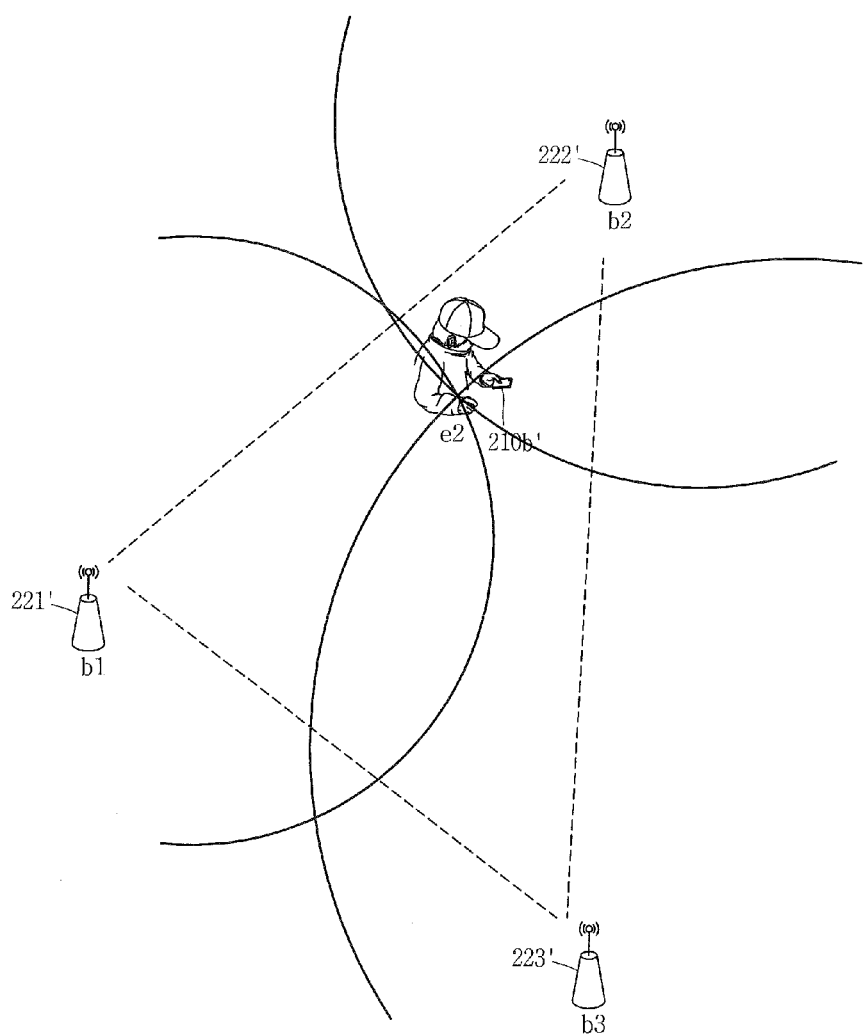
Figure 13:
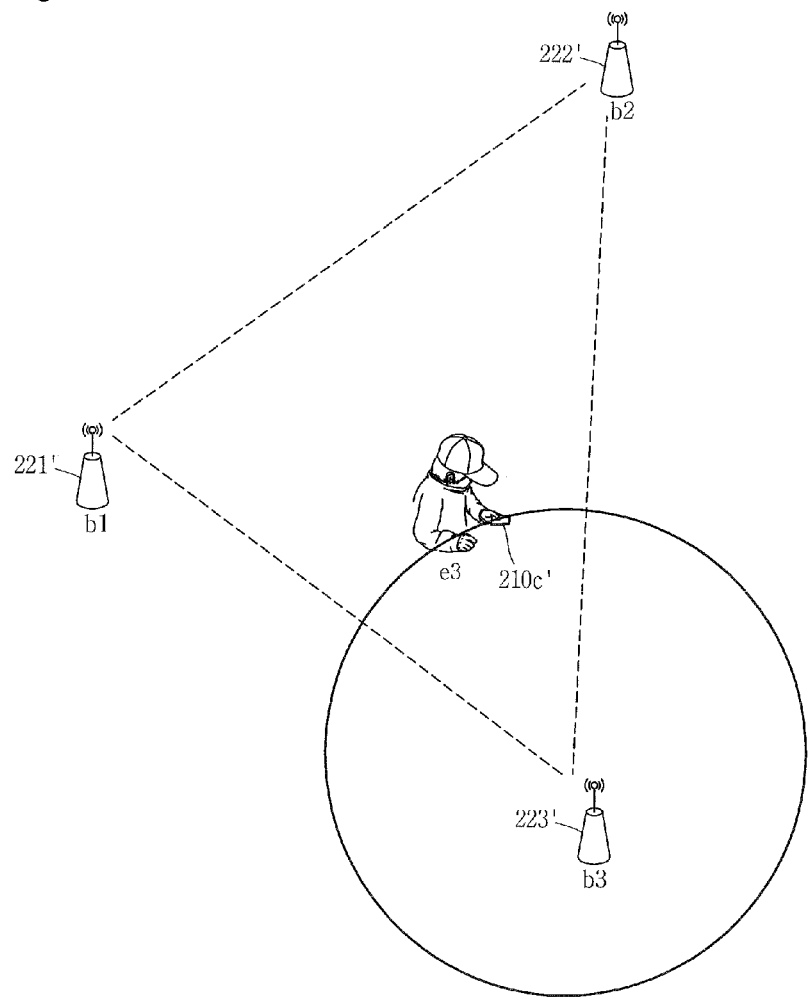

Thus, as shown in FIG. 12, the second coordinates e2 210b' reflect the relative distance information with the wireless APs computed in FIG. 9, and the second relative coordinates e2 210' are detected in the relative coordinates region. Similarly, as shown in FIG. 13, the third relative coordinates e3 210c' reflect relative distance information with the wireless APs computed in FIG. 9, and the third relative coordinates e3 210c' are detected in the relative coordinates region.

Figure 14:
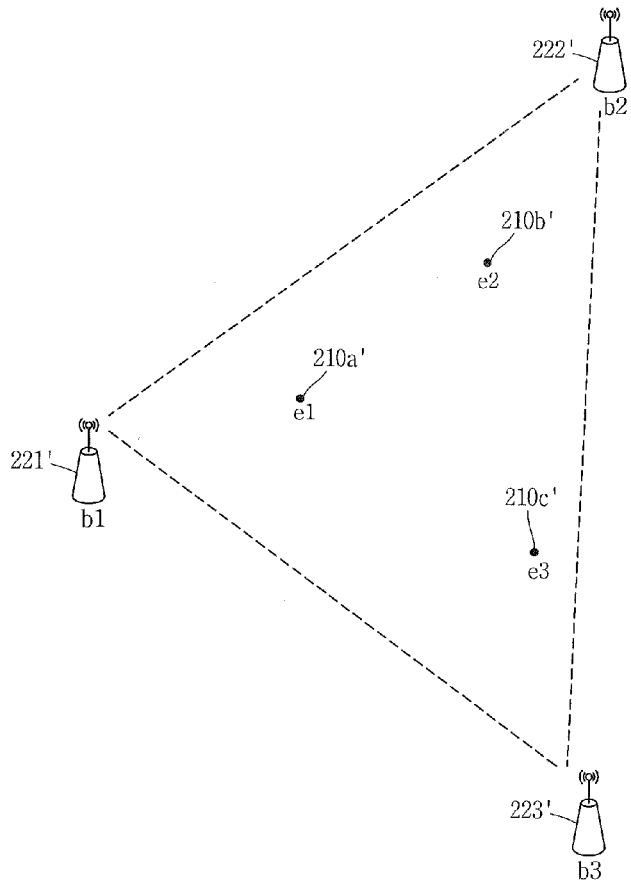

Through the above process, as shown in FIG. 14, the detection unit 182 may finally detect the first, second, and third relative coordinates e1, e2, e3 corresponding to the first, second, third absolute coordinates m1, m2, m3 (See FIG. 7).

Also, in the relative coordinates region, the distances between main bodies may refer to the absolute coordinates information of the already detected main body.

As described above, when the relative coordinates of the main body are detected through the steps S311, S312, S313, the controller 180 computes the absolute coordinates of the wireless APs which have transmitted the radio signals to the main body by using the previously collected absolute coordinates of the main body (S400).

When a conversion parameter for converting the relative coordinates of the main body into absolute coordinates of the main body is known, if the conversion parameter is applied to the relative coordinates of the wireless APs in the same manner, the relative coordinates of the wireless APs may be converted into absolute coordinates, respectively. This is because the relative coordinates of the main body have been computed by using the relative distance information with the wireless APs.

Also, in the following embodiment, the wireless APs existing on the same floor are described, but the present invention is not necessarily limited to computation of absolute coordinates of the wireless APs existing on the same floor and absolute coordinates of the wireless APs existing on a plurality of floors may be computed. A method thereof will be described later.

A method of computing absolute coordinates of wireless APs will be described in more detail with reference to FIGS. 15 and 16.

Figure 15:
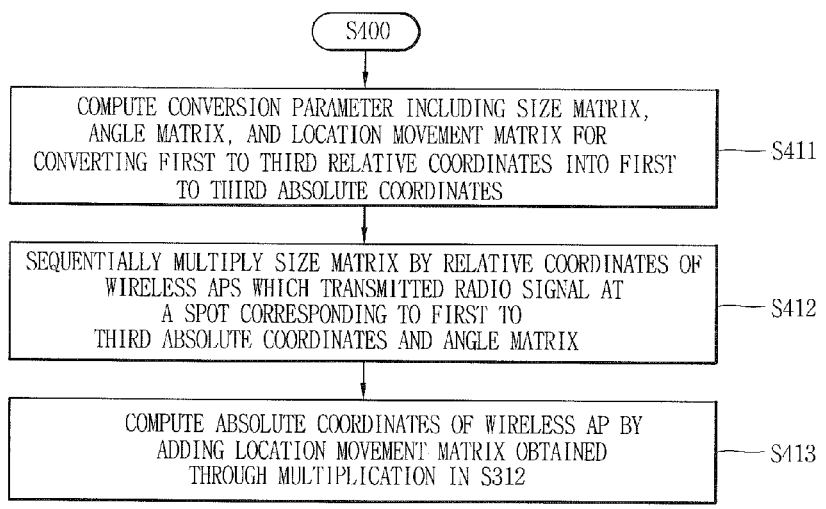
FIG. 15 is a flow chart illustrating a method of computing absolute coordinates of a wireless AP in the mobile terminal according to an embodiment disclosed in the present disclosure.
Figure 16:
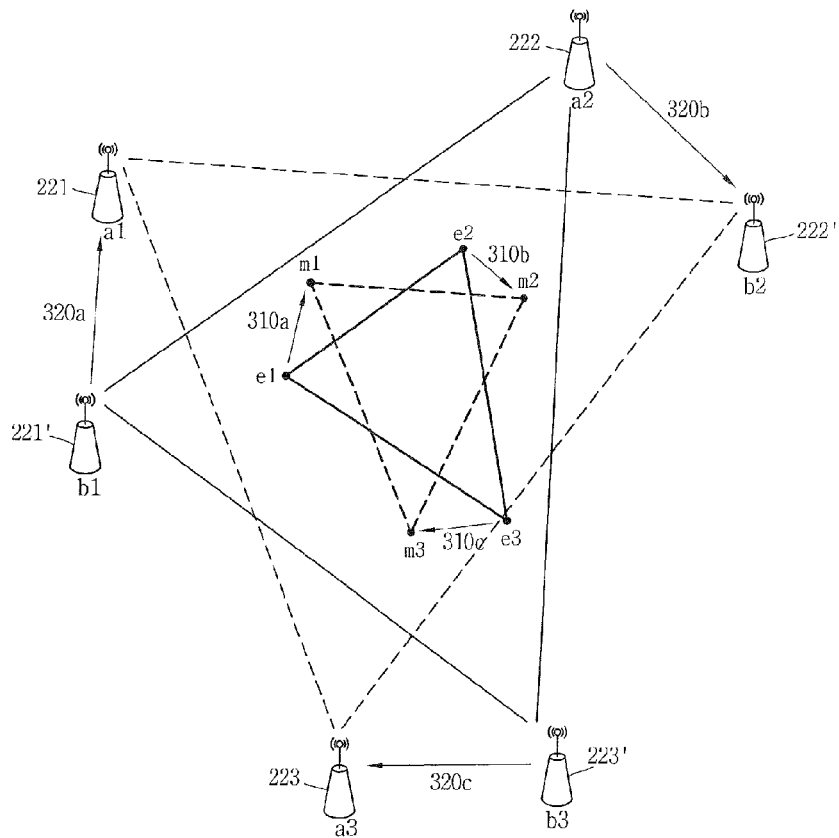
FIG. 16 is a conceptual view explaining a method of computing absolute coordinates of a wireless AP in the mobile terminal according to an embodiment disclosed in the present disclosure.

FIG. 15 is a flow chart illustrating a method of computing absolute coordinates of a wireless AP in the mobile terminal according to an embodiment disclosed in the present disclosure, and FIG. 16 is a conceptual view explaining a method of computing absolute coordinates of a wireless AP in the mobile terminal according to an embodiment disclosed in the present disclosure.

First, as shown in FIG. 16, it is assumed that first to third relative coordinates are e1, e2 and e3 and first to third absolute coordinates corresponding thereto are m1, m2, and m3, respectively.

Also, it is assumed that relative coordinates of a1, a2, and a3 wireless APs 221', 222', and 223' are b1, b2, and b3, and absolute coordinates of a1, a2, and a3 wireless APs corresponding thereto are a1, a2, and a3, respectively.

First, the detection unit 182 computes a conversion parameter including a size matrix Sc, an angle matrix Rc, and a location movement matrix Tc for converting the first to third relative coordinates e1, e2, and e3 into the first to third absolute coordinates m1, m2, and m3 (S411).

As described above, for a method of computing the conversion parameter for converting the first to third relative coordinates e1, e2, and e3 into the first to third absolute coordinates m1, m2, and m3, there are various algorithms such as Procrustes Analysis, and the like, and in the present disclosure, a detailed description thereof will be omitted.

The matrices obtained in the above are arithmetically operated to the relative coordinates (b1, b2, b3) matrix (Ym) of the wireless APs sequentially to compute absolute coordinates (a1, a2, a3) matrix (Zm) of the wireless APs (S412, S413).

Order of arithmetic operation is shown in following Equation [1].

$$Z_m = S_c \cdot Y_m \cdot R_c + T_c \qquad \text{Equation[1]}$$

Here, Zm is an absolute coordinates matrix of wireless AP, Sc is a size matrix, Ym is relative coordinates matrix of wireless AP, Rc is an angle matrix, and Tc is a location movement matrix.

The above matrices can be expressed in detail by following Equation[2].

$$\begin{bmatrix} X_{a1}, Y_{a1} \\ X_{a2}, Y_{a2} \\ X_{a3}, Y_{a2} \end{bmatrix} = \begin{bmatrix} S & 0 & 0 \\ 0 & S & 0 \\ 0 & 0 & S \end{bmatrix} \cdot \begin{bmatrix} x_{a1}, y_{a1} \\ x_{a2}, y_{a2} \\ x_{a3}, y_{a2} \end{bmatrix} \cdot \begin{bmatrix} R & 0 & 0 \\ 0 & R & 0 \\ 0 & 0 & R \end{bmatrix} + \begin{bmatrix} T_1, T_2 \\ T_1, T_2 \\ T_1, T_2 \end{bmatrix} \qquad \text{Equation [2]}$$

Here, S is a component of the Sc matrix in Equation 1, R is a component of the Rc matrix in Equation 1, and T1 and T2 are components of the Tc matrix in Equation 1.

Also, Xa1, Ya1, Xa2, Ya2, Xa3, Ya3 are components of the Zm matrix in Equation 1, and xb1, yb1, xb2, yb2, xb3, yb3 are components of the Ym matrix in Equation 1.

As noted from the matrix of Equation 2, the size of the Ym matrix corresponds to the number of wireless APs, the size of the Sc, Rc, and Tc matrices also corresponds to the number of wireless APs, and Sc and Rc are diagonal matrix satisfying it.

Meanwhile, Equation 1 and Equation 2 show embodiments of computing absolute coordinates of wireless APs, and besides, absolute coordinates of wireless APs may be computed through various other arithmetic operation processes.

As described above, by computing the absolute coordinates of the wireless APs by using the relative coordinates of the main body through the sequential arithmetic operation processes, various services may be received or provided by using the accurate absolute coordinates locations of the wireless APs.

Namely, when the absolute coordinates of the wireless APs are known, when a new wireless AP is intended to be installed, an appropriate location of the wireless AP to be installed can be recognized. Also, various wireless devices can be effectively managed by using it to establish a WiFi positioning system.

Also, in the above embodiments, the method of performing the processes in one terminal has been described. However, in the present disclosure, it is possible to compute absolute coordinates of a wireless AP by using location information collected from a plurality of terminals.

Namely, location information may be collected from terminals A and B, and the location information collected from the terminal B can be obtained by sharing it with the terminal A.

In this case, the terminal B should transmit radio signal information received at a spot at which location information was collected, together to the terminal A. Here, the radio signal information includes information of a wireless AP and strength of a radio signal or arrival time information.

Also, besides the method of sharing location information, or the like, between terminals, it is possible to compute absolute coordinates of a wireless AP by a system for computing absolute coordinates of a wireless AP.

In this case, the system may collect location information from at least one terminal and collect a radio signal received at a spot at which the location information was collected.

And, such a system may share various information through communication with several wireless APs.

Figure 17:
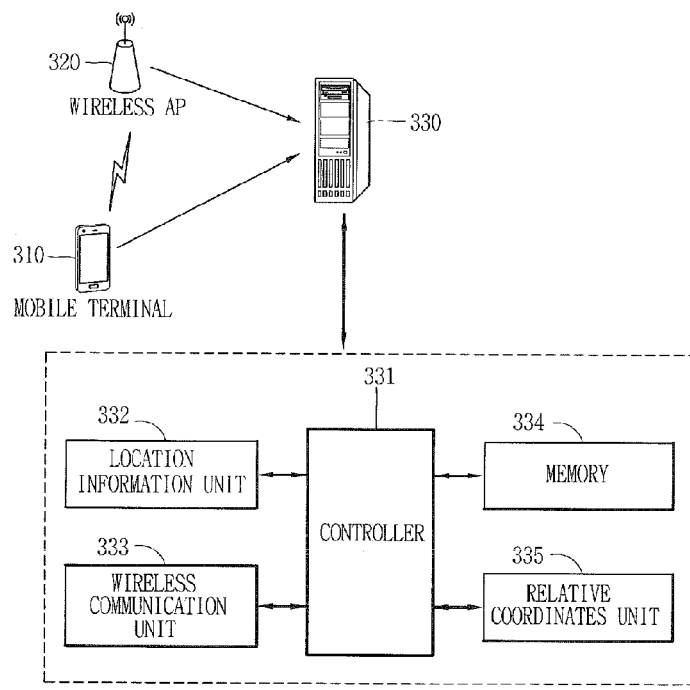
FIG. 17 is a block diagram of a system of computing absolute coordinates of a wireless AP by using the mobile terminal according to an embodiment disclosed in the present disclosure.

The system will be described in detail with reference to FIGS. 17, 18, and 19. FIG. 17 is a block diagram of a system of computing absolute coordinates of a wireless AP by using the mobile terminal according to an embodiment disclosed in the present disclosure, FIG. 18 is a flow chart illustrating a method of computing absolute coordinates of a wireless AP by using the mobile terminal according to an embodiment disclosed in the present disclosure, and FIG. 19 is a conceptual view explaining a method of computing absolute coordinates of a wireless AP by using the mobile terminal according to an embodiment disclosed in the present disclosure.

As shown in FIG. 17, a system 330 for computing absolute coordinates of a wireless AP may include a controller 331, a location information unit 332, a distance information unit 333, a memory 334, and a relative coordinates unit 335.

Figure 18:
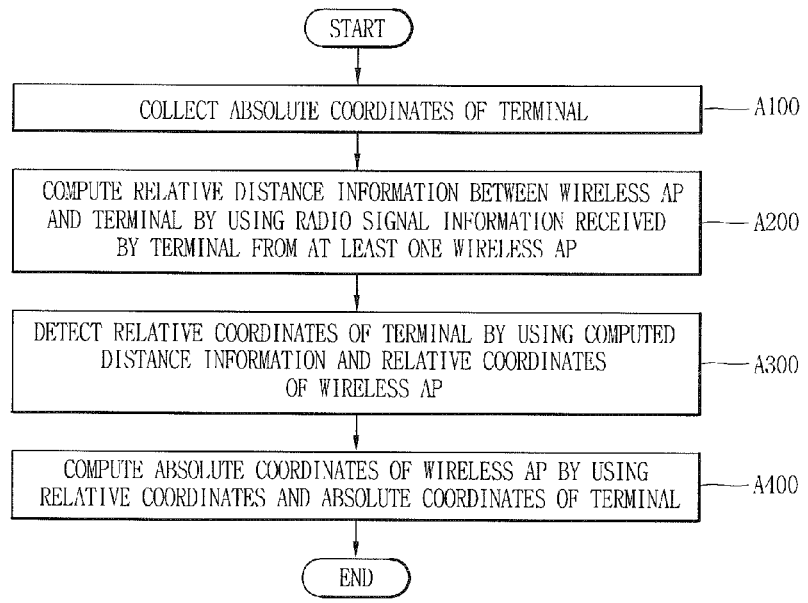
FIG. 18 is a flow chart illustrating a method of computing absolute coordinates of a wireless AP by using the mobile terminal according to an embodiment disclosed in the present disclosure.
Figure 19:
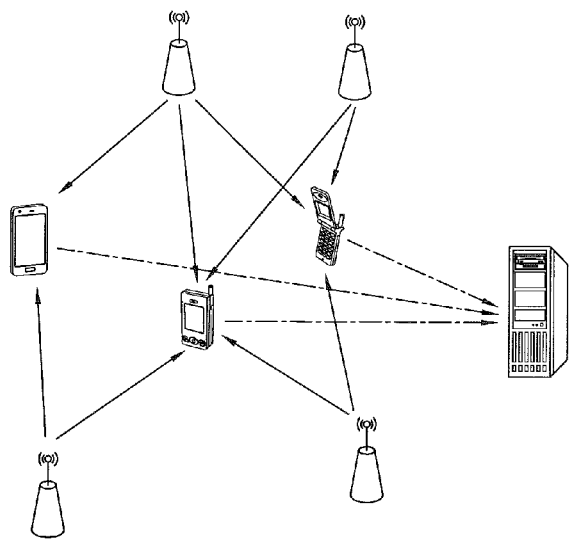
FIG. 19 is a conceptual view explaining a method of computing absolute coordinates of a wireless AP by using the mobile terminal according to an embodiment disclosed in the present disclosure.

Here, as shown in FIG. 19, the location information unit 332 collects at least three absolute coordinates from at least one mobile terminals 310a, 310b, and 311 (A100, See FIG. 18).

The distance information unit 333 computes relative distance information between the mobile terminals 310a, 310b, 311 and the wireless APs 320a, 320b, 320c, 320d by using strength of radio signals transmitted from the wireless APs 320a, 320b, 320c, 320d which have transmitted the radio signals or an arrival time of the radio signals (A200, See FIG. 18) (Details thereof are referred to the description with respect to FIGS. 5 to 9).

Meanwhile, the distance information unit 333 may directly compute the distance information, or may collect already computed information from the mobile terminals and use the collected information.

Next, the relative coordinates unit 335 compute relative coordinates of the mobile terminals 310a, 310b, 311 by using the relative coordinates of the wireless APs 320a, 320b, 320c, 320d and the distance information of the distance information unit 333 (A300, See FIG. 18).

Next, the controller 331 computes a parameter for converting the relative coordinates of the mobile terminals 310a, 310b, 311 into absolute parameters by using the relative coordinates and the absolute coordinates of the mobile terminals 310a, 310b, 311, and applying the computed parameter to the relative coordinates of the wireless APs 320a, 320b, 320c, 320d to compute absolute coordinates of the wireless 320a, 320b, 320c, 320d (A400, See FIG. 18) (Details thereof are referred to the description with respect to FIGS. 10 to 16).

As described above, the absolute coordinates of the wireless APs are not computed within the mobile terminals but can be computed by using the external wireless AP absolute coordinates computing system. Namely, when the absolute coordinates and the relative coordinates of the mobile terminals and the information regarding the strength of radio signals are known, both the mobile terminal or the external system can compute the absolute coordinates of the wireless APs.

Meanwhile, in the above, the method of computing absolute coordinates of the wireless APs existing on a single layer has been described. However, as mentioned above, in an embodiment of the present invention, absolute coordinates of the wireless APs existing on mutually different floors can be computed, and for this purpose, some processes should be performed to obtain relative coordinates of the wireless APs.

This will be described in detail with reference to FIG. 20.

Figure 20:
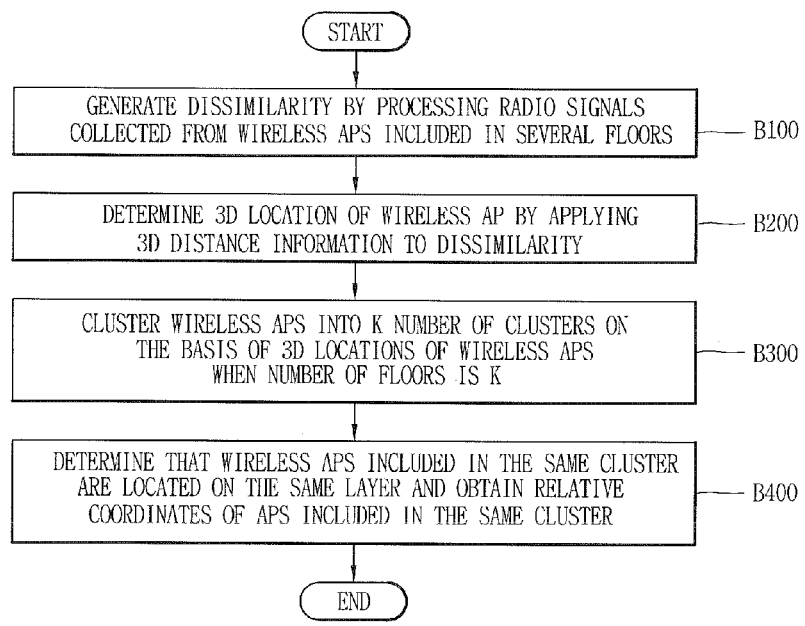
FIG. 20 is a flow chart illustrating a method of computing absolute coordinates of wireless APs existing in different floors by using the mobile terminal according to an embodiment disclosed in the present disclosure.

FIG. 20 is a flow chart illustrating a method of computing absolute coordinates of wireless APs existing in different floors by using the mobile terminal according to an embodiment disclosed in the present disclosure.

In general, radio signals transmitted to the mobile terminal include radio signals from a floor on which the mobile terminal exists and radio signals from wireless APs of neighbor floors. Thus, the mobile terminal obtains dissimilarity between wireless APs of different floors. The mobile terminal processes the radio signals collected from several floors altogether, and then, generates a dissimilarity matrix including dissimilarity between inter-floor wireless APs and infra-floor wireless APs.

Meanwhile, the signals transmitted from the wireless APs reach the mobile terminal existing on a different floor along several paths, and such radio signals may reach the mobile terminal directly through the floors or by bypassing the outside of windows.

Thus, the dissimilarity between the inter-floor wireless APs includes a different types of attenuation, and this may make it impossible to maintain consistence between the actual distance and the dissimilarity. As a result, an estimated shape may easily distorted, and in order to overcome this problem, a multi-floor wireless AP positioning, namely, a method of computing relative coordinates of wireless APs existing on the mutually different floors, may be applied.

First, radio signals collected by the mobile terminal from the wireless APs included in several floors are processed together to generate dissimilarity (B100).

Next, 3D locations of the wireless APs are determined by applying 3D distance information to the dissimilarity.

Next, when the number of floors is k, the wireless APs are clustered into k number of clusters on the basis of the 3D locations of the wireless APs (B300). Here, when the radio signals are received from the entire floors on the assumption that the number (k) of floors is given, k is the total number of floors of a building.

Next, the wireless APs included in the same cluster are determined to be located on the same floor, and relative coordinates of the wireless APs included in the same cluster are obtained (S400).

Namely, the wireless APs included in the mutually different layers are clustered and classified into a plurality of clusters, and relative coordinates of the wireless APs included in the same cluster may be computed.

Then, the absolute coordinates of the wireless APs can be computed from 2D coordinates without consideration of 3D coordinates of the wireless APs and the mobile terminal.

So far, in the present disclosure, 1) the method of computing absolute coordinates of wireless APs in one mobile terminal, 2) the method of computing absolute coordinates of the wireless APs by using location information collected from mutually different mobile terminals, 3) the method of computing absolute coordinates of the wireless APs in the wireless AP absolute coordinates computing system by using the location information collected from at least one mobile terminal, and 4) the method of converting relative coordinates of wireless APs existing on mutually different layers two-dimensionally have been described.

As described in 1), 2, 3), and 4), in the present disclosure, when it is possible to compute the absolute coordinates and the relative coordinates of the mobile terminal, the absolute coordinates of wireless APs can be computed any time.

When the absolute locations of the wireless APs are obtained, locations of mobile terminals can be estimated on the basis of the absolute locations of the wireless APs.

Next, in order to verify the method proposed in the present disclosure, the results obtained by performing measurement with respect to the method of detecting absolute coordinates of wireless APs in two buildings actually will be described.

FIG. 21 is a conceptual view explaining a method of computing absolute coordinates of wireless APs existing in different floors by using the mobile terminal according to an embodiment disclosed in the present disclosure.

FIGS. 21 (a) and (b) show a building A in which radio signals of successive five floors from 10th floor to 14th floor by HTC Hero operating in Android 1.5. The area of each floor was 35 m×50 m and height was about 3 m. An outer wall was surrounded by glass, and there are a rest room, an elevator, a staircase, and a conference room at the central region of each floor and mainly constructed with concrete. The area where people work was divided by flexible partitions, and six WiFi APs were attached to walls in each floor.

FIG. 21(c) show a building B in which radio scans with respect to a single floor were collected with three types of smart phones, i.e., HTC Hero operating in Android 1.5, Motorola DroidX operating in Android 2.1, and Samsung NexusS operating in Android 2.3.

The area of each floor was 27 m×37 m, and height was about 3 m. The area where people work was divided by flexible partitions. Nine WiFi APs were attached to the ceiling. Each floor was divided into three regions of A, B, and C to analyze the effect of cooperation.

Each scan (or 'collecting of radio signals', hereinafter, it is called 'scan') includes BSSID (Basic Service Sei Identifier), SSID (Service set Identifier), RSS (Radio Scan Strength), and scan time. Most scans were collected while walking with about normal steps. Smart phones were in hands or trouser pockets, and some scans were collected together with previous verification data used for analyzing performance.

Only BSSID and RSS were used in an experiment. There were many wireless APs having two BSSIDs. Here, two BSSIDs were handled as one. For the purpose of evaluation, actual locations of WiFi APs were manually detected. Table 1 show summary of collected radio scans.

TABLE 1

TABLE I
INFORMATION OF COLLECTED RADIO SCANS

| Location | Device | No. of Scans | No. of installed AP | Average no. of AP in a scan |
|---|---|---|---|---|
| A 10F | HTC | 2444 | 5 | 3.1 |
| A 11F | HTC | 13353 | 6 | 4.42 |
| A 12F | HTC | 23042 | 7 | 3 |
| A 13F | HTC | 4284 | 7 | 3.8 |
| A 14F | HTC | 2097 | 7 | 4.3 |
| B | HTC | 604 | 9 | 4 |
| B | DroidX | 520 | 9 | 9 |
| B | NexusS | 702 | 9 | 6 |

With reference to Table 1, it is noted that a total of 45220 radio scans were collected from a building A, and there are 3.7 number of APs on average per scan. In the building B, 1826 radio scans were collected. As for NexusS, it is noted that every AP exists in each radio scan.

The collected scans were processed in a notebook computer operating in a window XP (CPU: Intel Corel Duo CPU 1.83 GHz; Memory Size: 2 GB). A program for estimating dissimilarity was executed by C program. Matlab function midscale performing qualitative MDS as default by a tool of MDS (Multi-Dimensional Scaling) was used. The results of MDS were relative shapes of WiFi APs. Also, Matlab function procrustes for Procrustes analysis was used.

Relative AP Positioning in Building A

In an experiment of relative AP positioning, accuracy of a relative shape in the relative shape was attentive. The strongest signals from respective APs in the building A ranged from −23 dMm and −48 dBm. The weakest signal strength was −96 dBm. It was assumed that APs whose maximum signal strength was weaker than −50 dBm were located on different floors. The performance of the proposed algorithm is affected by a method of obtaining dissimilarity. 5-level quantization RSS was used as dissimilarity. An outline of a procedure used to compute the dissimilarity is as follows.

First, it was confirmed that the strongest RSS of scans was greater than a threshold value −50 dBm in the above execution. This means that the scans were collected from the vicinity of AP. Dissimilarity with respect to every AP was computed when the conditions are met. Or, the scans were discarded. In the static quantization, when RSS was greater than −47 dBm, −63 dBm, −75 dBm, −83 dBm and −90 dBm, dissimilarity was set to be 1, 2, 3, 4, and 5, respectively. In the dynamic quantization, threshold values with respect to each AP were dynamically determined from the maximum and minimum RSSs. This process was repeated for every scan. When smaller dissimilarity was discovered in a different scan, the dissimilarity was updated with a new value.

The computed dissimilarity includes a great number of mismatched pairs of pij and pji. Many factors cause such a phenomenon. Symmetry of radio waves is not guaranteed due to an environment influence although an AP hardware is identical.

In an embodiment of the present invention, dissimilarity between APs is indirectly measured by a smart phone. Pij can be computed from a scan measured at the closest distance to AP i. Meanwhile, pji can be computed from the closest measurement with APj. The locations of the two scans may not have the same geometrical conditions. One of the two scans may be closer to a line connecting the two APs, and dissimilarity thereof may have a smaller value. Thus, when the dissimilarity of the two APs is different, a smaller value is taken as dissimilarity.

In order to evaluate accuracy of relative AP positioning, Procrustes analysis was performed with actual locations of APs called Oracle to convert them into relative positions.

Figure 22:
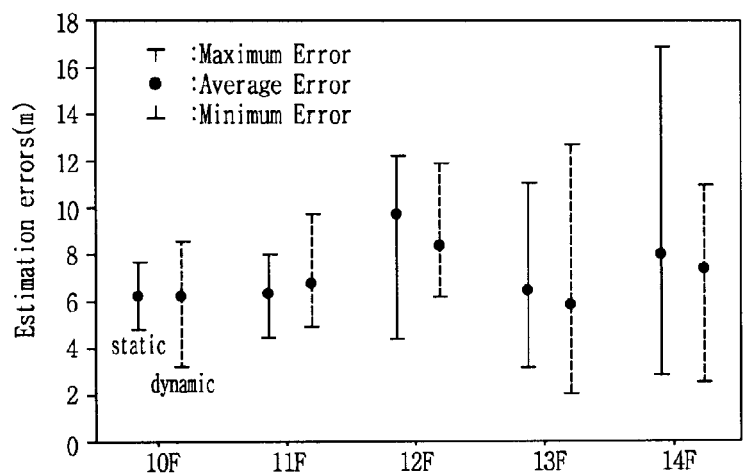
FIG. 22 is a table indicating a maximum error, an average error, and a minimum error of the estimated AP locations.

With reference to FIG. 22, respective bars indicate a maximum error, an average error, and a minimum error of the estimated AP locations. Solid lines indicate the results of static quantization, and dotted lines indicate the results of dynamic quantization. An average error of static quantization is 7.3 m, and an average error of dynamic quantization is 6.8 m. There are two reasons why performance of even number floors is better than that of odd number floors. The first reason is a difference between effective regions defined by a convex hull size. An effective region of the even number floors is far smaller than that of the odd number floors. This discriminates an actual connectivity indicating how many APs are connected to a single AP, and the performance of MDS is increased as connectivity is increased. The second reason is that topology of even number floors is useful. The topology of even number floors is round but the topology of odd number floors is complicate. When the disposition of even number floors was inspected to discover a great amount of concrete walls of a central region, and concrete is a structure through which radio signals can hardly penetrate. Although two APs of the central region are close, it is difficult to discriminate small dissimilarity therebetween.

Since Euclidean distance between APs cannot be estimated by RSS, proximity between APs was estimated by using static quantization. However, in the static quantization method, a quantization threshold value on the basis of domain knowledge (namely, transmission power and signal attenuation of AP) is required to be manually determined. The threshold value cannot be appropriately reflected in a surrounding environment with the inaccurate domain knowledge. In a building A, some quantization cases were experimented, in which four types of quantization levels of Q4, Q5, Q6 and Q7 were tested. FIG. 22 shows the results. In order to set a threshold value, maximum and minimum RSS values detected by a smart phone should be known, and this process is not actually practical. Appropriate values thereof are required to be assumed for static quantization. The maximum and minimum RSS values are OdBm and −100 dBm at the static Q1, and −20 dBm and −100 dBm at the static Q2. In a continuous case, RSS was converted into an actual distance. Variables were obtained by analyzing the entire radio scans, and for this analysis, radio scans along with their positions were collected. Used variable values were −27 dBm, 3.4, and 9 dBm, path loss index of shadow noise, and standard deviation n with respect to Po of 1 m from each AP. The range of RSS assumed in static quantization directly affect the performance. However, regarding the quantization levels, a considerable performance improvement was not discovered. It was assumed that there was no knowledge regarding the range of RSS in the dynamic Q, but the performance was similar to the continuous case. The dynamic quantization scheme successfully removes requirements of site-specific radio characteristics knowledge.

In order to demonstrate practicability of multi-floor AP positioning, dissimilarity matrix was computed by simultaneously processing all the scans collected from five successive floors. Three-dimensional MDS was applied to the dissimilarity matrix, and then, estimated locations of APs were discriminated into five clusters. Matlab function cluster was used for clustering. Surprisingly, the clustering results were 100% identical to the actual floors. These results demonstrate that the floors of APs can be discriminated with high accuracy by using only the radio scans collected from several floors.

Relative AP Positioning in Building B

Figure 23:
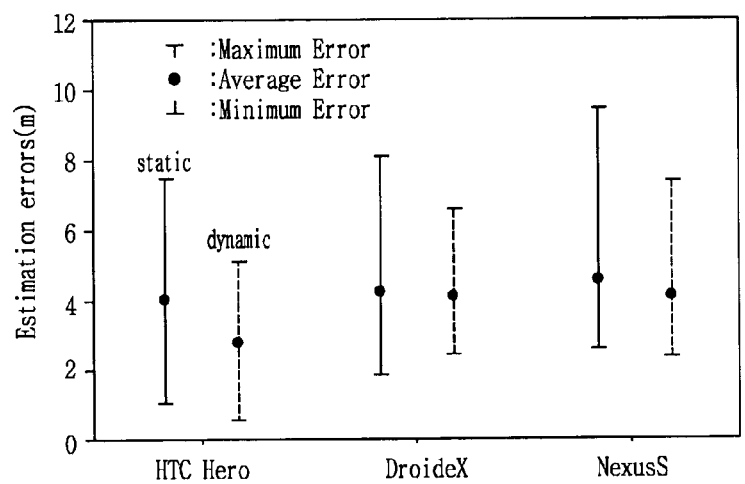
FIG. 23 is a table indicating a maximum error, an average error, and a minimum error of the estimated AP locations.

In a building B, radio scans were collected through the same route by three different smart phones, HTC Heo, Motorola DroidX, and Samsung NexusS on a different day. Relative AP positioning was performed with the scans, and the results are shown in FIG. 23.

An average error in the static quantization was 4.1 m and an average error in the dynamic quantization was 3.5 m, so about 13% was reduced. In the worst case, the error of estimation was also reduced in the dynamic quantization.

When it is compared with 6.7 m of the result of the building A, 3.5 m of the result of the building B shows much improvement in many reasons. First, density of WiFi APs is nine APs in 37 m×27 m, which is high. In previous research, the accuracy of AP positioning is improved as the number of APs is increased in a site. Second, the structure of the building B is simpler than that of the building A. Several concretes exist at the central region of the building A, and the structure of the building A makes it difficult for radio signals to penetrate.

Among the three devices, the best results were obtained by HTC Hero having an average error of dynamic quantization as 2.8 m. Similar results were obtained with Motorola DroidX and Samsung NexusS. This does not mean that HTC Hero is superior to the other devices in the aspect of AP positioning. Actually, the results show no conspicuous difference.

The distance range was 3 m to 33 m, and the RSS range was −65 dBm to −93 dBm. Maximum power of the WiFi AP was very weak, so there is value whose dissimilarity matrix is smaller than 3 in the static quantization. The distributions of the three types of devices show similar patterns. Since there is not much difference in radio characteristics among the devices with a similar form factor, the devices are considered to be cooperatively used.

Cooperative WiFi AP Mapping

The building B (See FIG. 21(c)) was divided into three regions A, B, and C, and it is assumed that each device can move in one region. This assumption is proper because actual movement of people is limited to a particular area. In order to simulate such a situation, radio scans of the respective devices were divided into three aggregates and AP positioning was performed only with radio scans of one region. Table III of Table 2 show the results using dynamic quantization. When radio scans were collected only from the region A with Hero, an AP positioning error was 8.4 m. In the entire case, an average error was 6.1 m. This results are an almost 2-fold poor numerical value when compared to the case of collecting radio scans in the entire region.

In order to confirm the effect of cooperation, radio scans were collected from the other regions of one aggregate. When it is assumed that only one device is used in one region, a total of six combinations can be obtained. TABLE IV in Table 2 shows the results of cooperative AP positioning. In case 6, radio scans were collected with NexusS in the region A, with DroidX in the region B, and with Hero in the region C, and in the best case, an estimation error was 3.1 m in the dynamic quantization. An average error was 3.4 m in the dynamic quantization, and this is similar to the results of collecting radio scans of the entire region by one device. This results show that the cooperation of general smart phone users can achieve AP positioning without a conspicuous loss in the accuracy when compared to a case of collecting radio scans over the entire point of interests by one smart phone.

Table 2

TABLE III

AP POSITIONING WITH PARTIAL RADIO SCANS (AVERAGE ERROR IN METERS)

|  | Area A | Area B | Area C |
| --- | --- | --- | --- |
| Hero | 8.4 | 5.9 | 3.6 |
| DroidX | 6.0 | 6.6 | 5.7 |
| NexusS | 6.1 | 4.5 | 8.3 |

TABLE IV

COLLABORATIVE AP POSITIONING RESULTS (AVERAGE ERROR IN METERS)

|  | Area A | Area B | Area C | Static | Dynamic |
| --- | --- | --- | --- | --- | --- |
| Case 1 | H(ero) | D(roidX) | N(exusS) | 3.9 | 3.2 |
| Case 2 | H | N | D | 4.6 | 3.9 |
| Case 3 | D | H | N | 4.5 | 3.8 |
| Case 4 | D | N | H | 4.6 | 3.4 |
| Case 5 | N | H | D | 3.7 | 3.4 |
| Case 6 | N | D | H | 3.6 | 3.1 |
| Average |  |  |  | 4.1 | 3.4 |

As described above, the method of measuring locations of WiFi APs in an unsupervision manner by using radio scans collected by the general smart phone users has been proposed. Such work can eliminate the necessity of previous verification data inspection, promoting participation of the general public. Estimated locations of WiFi APs can be used for several purposes such as establishing a WiFi positioning system, management of a WiFi wireless network, and the like.

Through the mobile terminal and the method of computing absolute coordinates of a wireless AP according to an embodiment of the present invention, absolute coordinates of a wireless AP can be easily obtained by applying a conversion parameter for converting absolute coordinates of a mobile terminal into relative coordinates to relative coordinates of the wireless AP.

Also, through the mobile terminal and the method of computing absolute coordinates of a wireless AP according to an embodiment of the present invention, a wireless network positioning system can be established by computing absolute coordinates of wireless APs.

In the embodiments of the present invention, the foregoing method can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising:
a main body;
a location information unit mounted in the main body and collecting at least three absolute coordinates of the main body from at least three different locations;
a wireless communication unit transmitting and receiving radio signals between external wireless access points (APs) and the main body, the radio signals used for computing relative distance information between the APs and the main body;

a detection unit detecting at least three relative coordinates of the main body by using the relative distance information and pre-set relative coordinates of the wireless APs; and a controller:
computing a conversion parameter for converting the detected at least three relative coordinates of the main body into the at least three absolute coordinates, each of the at least three absolute coordinates of the main body respectively corresponding to one of the at least three relative coordinates of the main body; and
computing absolute coordinates of the wireless APs by using the conversion parameter,
wherein the conversion parameter is a matrix having a size corresponding to a number of the absolute coordinates of the main body.

2. The mobile terminal of claim 1, wherein the wireless communication unit transmits and receives the radio signals to and from the wireless APs at spots corresponding to the at least three locations at which the at least three absolute coordinates were collected.

3. The mobile terminal of claim 2, wherein the controller computes distance information corresponding to the radio signals, and matches the computed distance information to the at least three absolute coordinates and the wireless APs which transmitted the radio signals to the main body at the spots corresponding to the at least three locations at which the at least three absolute coordinates were collected.

4. The mobile terminal of claim 3, wherein:
the wireless APs, which have transmitted the radio signals to the main body, were previously disposed at the spots corresponding to the locations at which the at least three absolute coordinates were collected, on a pre-set relative coordinate region; and
the detection unit detects the at least three relative coordinates of the main body located at the spots that are distanced by the matched distance information from the pre-set relative coordinates of the wireless APs which have transmitted the radio signals to the main body at the spots corresponding to the location at which the at least three absolute coordinates were collected, by using the distance information matched to the at least three absolute coordinates.

5. The mobile terminal of claim 4, wherein the detection unit matches the detected at least three relative coordinates to the at least three absolute coordinates.

6. The mobile terminal of claim 5, wherein the size of the matrix also corresponds to a number of the pre-set relative coordinates of the wireless APs disposed in the pre-set relative coordinate region.

7. The mobile terminal of claim 6, wherein the matrix includes at least one of a size matrix, an angle matrix, or a location movement matrix, and the size of the at least one of the size matrix, the angle matrix, or the location movement matrix corresponds to the number of the pre-set relative coordinates of the wireless APs.

8. The mobile terminal of claim 7, wherein the absolute coordinates of the wireless APs disposed in the pre-set relative coordinate region are computed through a pre-set computation process using the pre-set relative coordinates of the wireless APs disposed in the pre-set relative coordinate region and the conversion parameter.

9. The mobile terminal of claim 8, wherein the pre-set computation process is sequentially multiplying the size matrix, the pre-set relative coordinates of the wireless APs, and the angle matrix, and adding the location movement matrix to a result value of the multiplication.

10. The mobile terminal of claim 1, wherein the radio signals received from the spots each corresponding to the collected at least three absolute coordinates are received from a same wireless AP or at least one of the radio signals is received from a different wireless AP.

11. The mobile terminal of claim 1, wherein the distance information is computed by using at least one of a strength of the radio signals received from the wireless APs or a time of arrival (TOA) of the radio signals received from the wireless APs.

12. A method for computing absolute coordinates of wireless access points (APs) at a mobile terminal, the method comprising:
collecting at least three absolute coordinates of a main body of the mobile terminal from at least three different locations;
computing relative distance information between the wireless APs and the main body by using radio signals transmitted from the wireless APs to the main body;
detecting at least three relative coordinates of the main body by using the relative distance information and pre-set relative coordinates of the wireless APs;
computing a conversion parameter for converting the detected at least three relative coordinates of the main body into the at least three absolute coordinates, each of the at least three absolute coordinates of the main body respectively corresponding to one of the at least three relative coordinates of the main body; and
computing absolute coordinates of the wireless APs by using the conversion parameter,
wherein the conversion parameter is a matrix having a size corresponding to a number of the absolute coordinates of the main body.

13. The method of claim 12, wherein in the computing of the relative distance information, the computed distance information is matched to the at least three absolute coordinates and the wireless APs which have transmitted the radio signals to the main body at spots corresponding to the at least three locations at which the at least three absolute coordinates were collected.

14. The method of claim 13, wherein the computing of the absolute coordinates of the wireless APs comprises:
applying the computed conversion parameter to the pre-set relative coordinates of the wireless APs by using a pre-set computation method.

15. A system for computing absolute coordinates of wireless access points (APs), the system comprising:
a mobile terminal;
a location information unit collecting at least three absolute coordinates of the mobile terminal;
a distance information unit computing relative distance information between the wireless APs and the mobile terminal by using radio signal information received by the mobile terminal from the wireless APs;
a relative coordinates unit detecting at least three relative coordinates of the mobile terminal by using the relative distance information and pre-set relative coordinates of the wireless APs; and
a controller:
computing a conversion parameter for converting the detected at least three relative coordinates of the mobile terminal into the at least three absolute coordinates, each of the at least three absolute coordinates of the mobile terminal respectively corresponding to one of the at least three relative coordinates of the mobile terminal; and computing absolute coordinates of the wireless APs by using the conversion parameter,
wherein the conversion parameter is a matrix having a size corresponding to a number of the absolute coordinates of the mobile terminal.

16. The system of claim 15, wherein the location information unit collects at least one absolute coordinate from each of a plurality of mobile terminals.

* * * * *